Feb. 13, 1940.  J. M. CUSTENBORDER  2,190,259
GEARING
Filed June 6, 1938
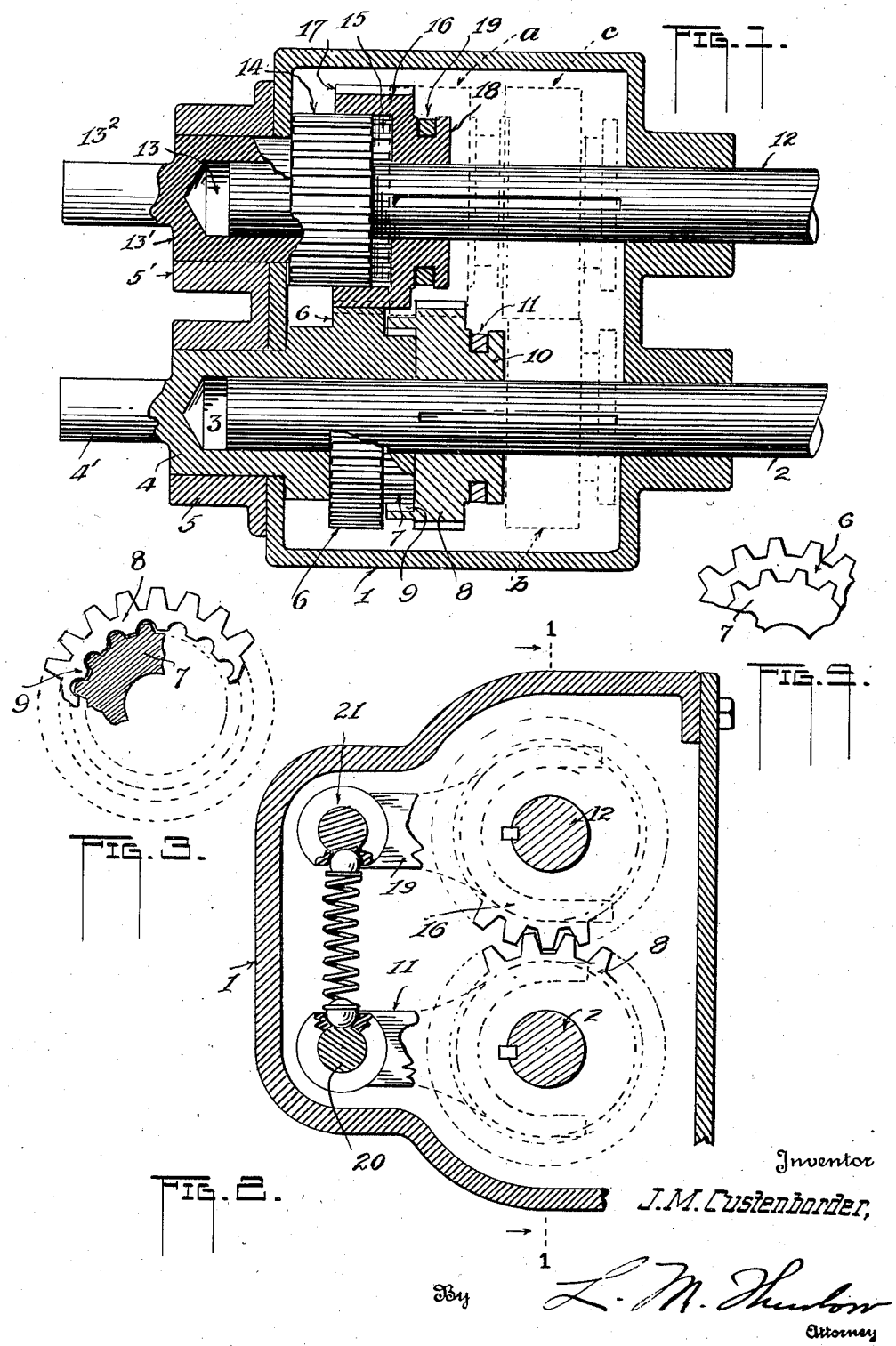
Inventor
J. M. Custenborder,
By
L. M. Thurlow
Attorney Patented Feb. 13, 1940

2,190,259

UNITED STATES PATENT OFFICE 2,190,259

GEARING

John M. Custenborder, Mackinaw, Ill., assignor to Samuel E. Baughman, Broadwell, Ill.

Application June 6, 1938, Serial No. 212,076

7 Claims. (Cl. 74—389)

This invention relates to transmission gearing. More particularly the invention has to do with a type of transmission including a gear arrangement by which a plurality of driven outlets from a gear box may be driven from a single driving element.

The main object of the invention is the provision of a gearing so constituted and arranged as to provide a series or plurality of driven elements as outlets from a gear box, any two or more, or all of which may be operated for separately driving machines with which said elements may be connected.

Another object lies in so constituting a set of gears and their associated parts that, through gear shift mechanism, a selected outlet element of a gear box may be placed in rotation, also that one, or any two or more of such elements may be rotated, or that all of a plurality of elements may be rotated from a single driving element.

To the end that the invention may be understood the accompanying drawing is provided, forming part hereof, in which:

Figure 1 is a longitudinal section of a gear box or case showing certain gears therein in section.

Figure 2 is an end elevation in section of said gear box, and

Figure 3 is an end elevation of gear together with a clutch mechanism taking the form of a toothed member adapted to be received into said gear.

Figure 4 is an end elevation of a gear unit having two gears, one having a less number of teeth than the other, as the same would appear viewed from the right in Figure 1.

At times it is required or it is at least advisable to operate several types of machines from a common power source as a matter of both convenience and necessity where circumstances control given situations. As an example, in the winter season when hard roads become covered with ice and snow trucks carrying cinder spreaders are placed in service, and often a snow removing machine accompanies a truck, drawn by the latter. As such a machine may not always carry its own power source some arrangement must be provided for driving its mechanism.

Since the truck has its own power source, i. e., its own driving motor, the power therefrom may be employed to drive the mechanism of such machine. In such case the problem is to take off power from the truck's motor, perhaps, in a proper and efficient manner, or through the use of some other power source, perhaps, carried by such truck.

This can easily be met by a gear arrangement such as is shown and now to be described herein, or its equivalent.

The foregoing is but one of the uses to which the present invention may be applied, it being understood that the said invention is the solution of many other situations, where power is required.

A gear box or case of any desired form is denoted at 1, while a power shaft 2 driven from any desired source is journaled in said box and whose inner end terminates within a bore 3 of a member 4, which, in this instance, is journaled in an attached bearing 5 in a wall of said box or case. Said member 4 has a stub shaft 4' for attachment to any machine to be operated, but not shown herein, and said member 4 is provided within the box or case 1 with a gear 6 adjacent which in fixed relation thereto is a "gear" 7 of smaller diameter, or having a less number of teeth, the said shaft 2 being freely revoluble therein.

Splined on said shaft is a gear 8, in this case having the same number of teeth externally as the gear 6, and being cavited adjacent the latter and provided with internal teeth 9 to engage the teeth of the gear 7, as in Figure 3, wherein it is to be observed that the teeth of the so called "gear" 7 locks with the teeth 9 constitutes a positive clutch engagement by means of which the shaft 2 and the member 4 with its stub shaft 4' as a power outlet are locked together when desired, said gear 8 including a flanged shifting portion 10 receiving a shifting arm or fork 11, Figure 2.

A companion shaft, as one to be driven, is represented at 12 whose end within the box or case 1 is journaled in the bore 13 of a member 13' journaled in a bearing 5' companion to the bearing 5 mentioned, said member having an extended stub shaft 13², as an outlet element for power.

Said member within the box or case 1 terminates in a tooth portion 14 similar to the part 7 described and in the same manner interlocks with internal teeth 15 of a gear 16 whose teeth 17 are adapted to mesh with the named gear 6, said gear, as with the gear 8, including a flanged shifting portion 18 receiving a shifting arm or fork 19. Both arms 11 and 19 are carried on rods 20 and 21, respectively shiftable independently in directions paralleling the shafts 1 and 12 to various positions for purposes to be understood presently, the means for shifting said rods having no part in the present invention and hence not illustrated.

In the position of the parts shown in full lines in Figure 1 the gears 6, 8 and 16 are in mesh. Also the internal teeth of the gear 8 are in clutching engagement with gear 7.

During rotation of the power supplying shaft 2 all three of the outlets 4′ and 13² and 12 will be rotated due to the fact that said gears 8 and 16 are splined to the shafts carrying them. Thus each said outlet may drive a separate mechanism, not shown.

If, however, the gear 16 is shifted to the broken line position a the clutch gear 14 will be released whereupon outlets 4′ and 12 only will be in operation since said gear 16 is in mesh with the gear 8 of the power shaft 2.

Again, if the gears are in the driving engagement shown in continuous lines in said Figure 1 but with the gear 8 disengaged for clutch gear 7, see broken line position b, only the drive shaft 2 and free gear 8 will be in rotation.

When, on the other hand, the gears 8 and 16 are both drawn out of mesh while meshing with the other relation as at b, c only the power shaft and outlet 12 will be in rotation.

Or, with the gear 16 in the position at c with all other gears in mesh only the outlets 4′, 13² will be in rotation with the power shaft 2.

The structure described or its equivalent, therefore, admits of these several different driving combinations and due to such structure several different types of machines may be operated from a common power source, this being a special advantage when these machines may be required to act together to produce a required final result.

While the elements 4′, 13² and 12 in the present instance rotate all in the same direction they may, of course, be reversed in direction of rotation by reversing the direction of drive of the power delivery shaft 2 by any desired mechanism outside the case 1, but not shown since well known.

I claim:

1. Mechanism for the purpose described having a plurality of three outlet elements for delivering power, each for driving a separate mechanism, the same including, in combination, a power shaft, a gear having its axis of rotation coincident with that of said shaft and including therewith one of said outlet elements, a second gear splined on said shaft, the two gears having provision for clutching each other in driving relation, a driven shaft constituting one of said outlet elements, a clutch part on said driven shaft, the latter being free to rotate with respect to said clutch part, the latter constituting another outlet element, and a gear splined on said driven shaft adapted to be meshed with either gear of the driving shaft and having a clutch part to engage the clutch part on the driven shaft having said outlet element.

2. Mechanism for the purpose described including, in combination, a mounted driving power element, a plurality of mounted elements to be driven therefrom, each element of said plurality of elements being adapted for connection with a separate part to be operated, the axis of rotation of one of the driven elements being coincident with and in line with said driving element and including a gear and a clutch part, a clutch member splined on said driving element adapted to engage said clutch part for positively driving said driven element, two of the other driven elements of said plurality of elements being in axial alignment, a clutch part on one of them, a gear splined on the other of the two said elements adapted to engage the gear of the first named driven element and including a clutch part for positively engaging the last named clutch part.

3. In mechanism for the purpose described including, in combination, a mounted driving power element, a plurality of mounted elements to be driven therefrom, each element of said plurality of elements adapted for connection with a separate part to be operated, the axis of rotation of one of the driven elements coincident with that of the driving element, said driven element including a gear and a clutch part as a unit therewith, a gear splined on the driving element including a clutch part to engage the first named clutch part, two of the other driven elements of the said plurality of elements being in axial alignment with each other, a clutch part on one of them as a unit therewith, a gear splined on the other of the two said elements adapted to engage either of the two first named gears and having a clutch part to engage the last named clutch part.

4. In mechanism for the purpose described including, in combination, a gear case, a driving power-shaft journaled therein, an element to be driven also journaled therein in axial alignment with the said shaft but normally independent thereof, a gear fixed with respect to the driven element, a clutch part, also fixed with respect to the element, a clutch element splined on and shiftable along the power shaft adapted to engage the named clutch part, a second shaft to be driven also journaled in the case, an element to be driven likewise journaled in the case in axial alignment with said second shaft, a clutch member fixed with respect to the element, a gear splined on said second shaft and shiftable therealong, and having a clutch portion to engage the last named clutch member, the last named gear adapted to mesh with the first named gear.

5. In mechanism for the purpose described including, in combination, a gear case, a driving power-shaft journaled therein, an element to be driven also journaled therein in axial alignment with the said shaft but normally independent thereof, a gear fixed with respect to the driven element, a clutch part also fixed with respect to the element, a clutch element splined on and shiftable along the power shaft adapted to engage the named clutch part, gear teeth on the clutch element of the power shaft, a second shaft to be driven also journaled in the case, an element to be driven likewise journaled in the case in axial alignment with said second shaft, a clutch member fixed with respect to the element, a gear splined on said second shaft and shiftable therealong, and having a clutch portion to engage the last named clutch member, the last named gear adapted to be meshed either with the gear of the power shaft or with the gear of the first named element.

6. A gear case, a pair of shafts, a driving and a driven, journaled therein paralleling each other, and each having an outlet from said case, a spur gear slidable along and splined to each shaft and adapted to have meshing engagement, a clutch part in fixed relation to each gear, a pair of elements to be driven also journaled in the case and each having an outlet from the same, their axes of rotation being coincident with the axes of the named shafts and said elements being normally independent of the latter, a clutch part fixed with respect to one of them adapted to engage with the clutch part of the named driven shaft, a spur gear and a clutch part as a unit fixed with respect to the other element, said clutch part adapted to engage the clutch part of the spur gear of the driving shaft, the spur gear of the driven shaft also adapted to have meshing engagement with the named spur gear of the outlet element of said driving shaft.

7. Gear mechanism adapted for driving two or more power outlets each to operate a separate mechanism, the same including, in combination, a power shaft, a combined gear and clutch part mounted on the shaft and rotatable with respect to the same and including a power outlet, a combined gear and clutch part splined on said shaft, the clutch parts adapted to engage each other, a driven shaft constituting a power outlet, a clutch part freely mounted on said driven shaft and including a power outlet, and a combined gear and clutch part splined in said driven shaft, said clutch part adapted for engagement with the last named clutch part, the last named gear adapted to mesh with either gear on the driven shaft.

JOHN M. CUSTENBORDER.